INVENTOR.
ALFRED E. ECKERMANN JR.
BY
ATTORNEY

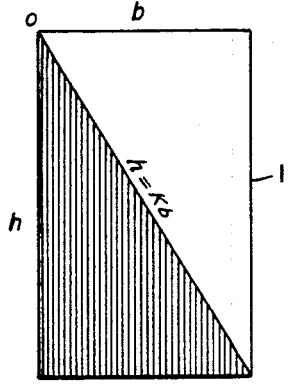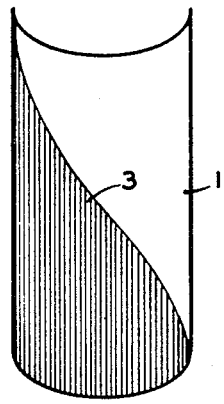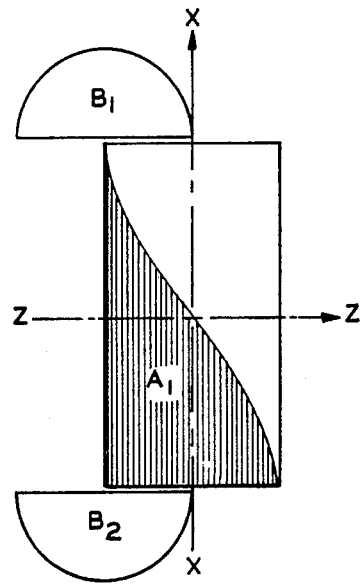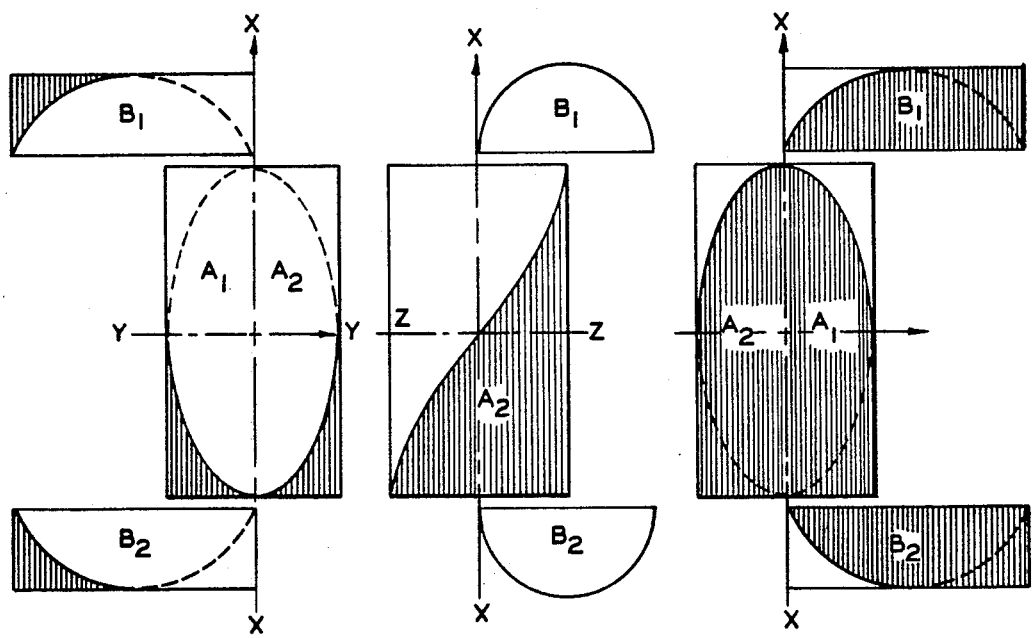
FIG. 1    FIG. 2    FIG. 3    FIG. 4    FIG. 5    FIG. 6

United States Patent Office 3,283,158
Patented Nov. 1, 1966

3,283,158
LIGHT SENSING DEVICE FOR CONTROLLING ORIENTATION OF OBJECT
Alfred E. Eckermann, Jr., Hasbrouck Heights, N.J., assignor to The Bendix Corporation, Teterboro, N.J., a corporation of Delaware
Filed May 4, 1962, Ser. No. 192,468
9 Claims. (Cl. 250—211)

The invention relates to light sensing devices and more particularly to a light sensing device for controlling orientation of an object or vehicle to the sun or other light source.

The sensing device of the present invention is particularly adapted to establish a reference for the attitude control of space vehicles. When a vehicle is propelled into space, the vehicle tumbles at random and must be oriented to a desired attitude in space relative to a preselected reference. When the sun is used as the reference, the sensor must locate the sun over a substantial solid angle and thereafter accurately track the sun to control the attitude of the vehicle. Sun sensors as used heretofore have a small sun locating range and in addition they are bulky, heavy and unreliable in operation.

One object of the present invention is to provide a reliable, light weight, compact, light sensing device which locates a light source, such as the sun, over a large solid angle.

Another object of the invention is to provide a light sensing device having a single arrangement for locating the sun over a large solid angle.

Another object of the invention is to convert light signals into control signals corresponding to the attitude of the light sensing devices relative to the light source.

Another object of the invention is to provide control signals which are linearly proportional to the attitude of the light sensing device relative to the light source over the entire range.

Another object of the invention is to provide signals which are linear for zenith angular displacement of the vehicle between 0 and ±90 degrees for all azimuth angular displacements from 0 to 360 degrees.

Another object of the invention is to provide a novel method of making a light sensitive cell.

The invention contemplates a novel light sensing device comprising a photo-voltaic cell, semicylindrical in shape, and coated with light sensitive material at one side of a line corresponding to the function $h=kb$, where $h$ is the height of the semicylinder and $b$ is one-half the circumference of the cylinder and $k$ is a constant of proportionality. The cylinder may be made from a rectangular sheet of material in which the line is a diagonal of the rectangle.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings:
FIGURE 1 is a developed view of a light sensitive element constructed according to the invention.

FIGURE 2 is a perspective view of the light sensitive element.

FIGURES 3, 4, 5, and 6 are schematic drawings of a light sensing device including a plurality of light sensitive elements constructed according to the invention for controlling the attitude of an object from a light source about axes at right angles to one another, each successive view of the light sensing device in FIGURES 3 to 6 being rotated through an angle of 90 degrees about the X axis.

Figure 7:
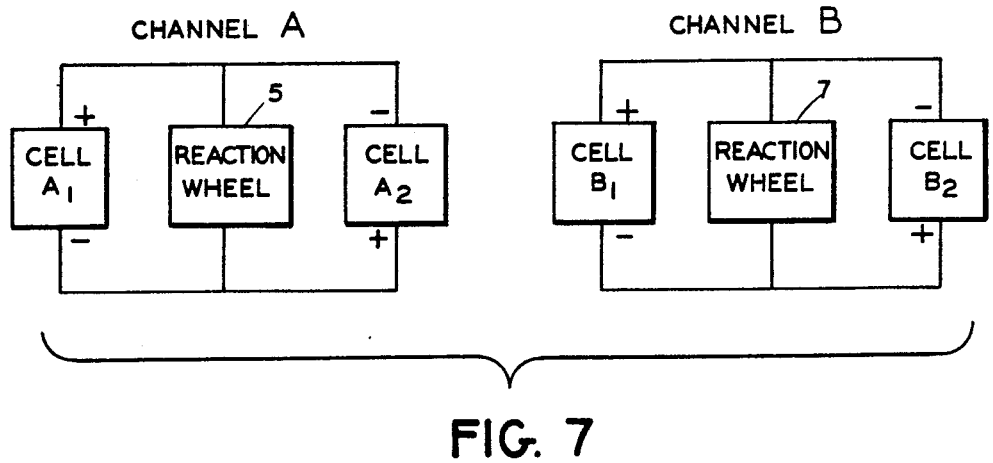
FIGURE 7 is a wiring diagram showing the connections of the light sensitive elements in a circuit for controlling the attitude of the object.

Referring to the drawings and more particularly to FIGURES 1 and 2, shown therein is a novel photo-voltaic cell constructed according to the present invention. The cell comprises a sheet of material 1 rectangular in shape having a height $h$ and a base $b$ curved into a semicylinder having a radius $r=b/\pi$ and a height $h$. A diagonal line 3 corresponding to the function $h=kb$ is inscribed on the sheet, where $k$ is a constant. The outer surface of the sheet is coated with a photo sensitive material below line 3 as indicated by the shaded area in the figures, and the portion of the sheet above line 3 may be cut away or masked so that it is insensitive to light rays.

The sheet may be made of iron approximately 1/32 inch thick bent into a semicylinder as described above and suitably masked. The sheet is placed in a vacuum chamber and the outer surface is exposed to selenium vapor to deposit a coat of selenium on the unmasked area. Wire leads are connected to the iron and to the selenium surfaces for connecting the cell in a suitable circuit.

The cell also may be made from a silicon crystal of desired purity and cylindrical in shape. The crystal may be sliced in half to form two semicylinders which are suitably masked and then placed in an evacuated chamber filled with boron vapor at a temperature approximately twelve hundred degrees C. to maintain the boron in the vapor state and for a time long enough to permit the boron atoms to diffuse into the unmasked portion of the curved surface of the silicon crystal. Appropriate wire leads are connected to the flat surface of the semicylinder, that is, to the pure silicon, and to the curved surface diffused with boron.

Two cells A1 and A2 of the kind shown in FIGURE 2 operate as a pair in a circuit, as shown in FIGURE 7, and are connected in opposition to one another and to a reaction wheel 5 or other device for orienting a vehicle in space about an axis X. A second pair of cells B1 and B2 may be used for controlling a reaction wheel 7 for orienting the vehicle in space about an axis Y at right angles to the X axis. Suitable amplifiers, not shown, may be used to provide adequate power for operating the reaction wheels from the outputs of the pairs of cells.

The cells may be fixed to the vehicle in the arrangement shown in FIGURES 3 to 6 so that the axes of the cells A1 and A2 are at right angles to the axes of the cells B1 and B2, and so that one pair of cells does not cast a shadow on the other pair of cells. As shown in the figures the axes of cells A1 and A2 are positioned parallel to the X axis and the axes of cells B1 and B2 are positioned parallel to the Y axis.

When the light source is coincident with the Z axis, which is mutually perpendicular to the X, Y axes, light from the source equally illuminates cells A1 and A2, and B1 and B2 so that equal voltages or currents are generated by the cells and the net output of opposed cells A1 and A2, and B1 and B2 is zero. When the vehicle is oriented in space so that the light source is not coincident with the Z axis, light from the source illuminates the pairs of cells A1, A2 and B1, B2 unequally and the more highly illuminated cell of each pair generates a higher voltage or current than the other cell of the pair and reaction wheels 5, 7 operate to orient the vehicle so that the light source is aligned with the Z axis.

Figure 8:
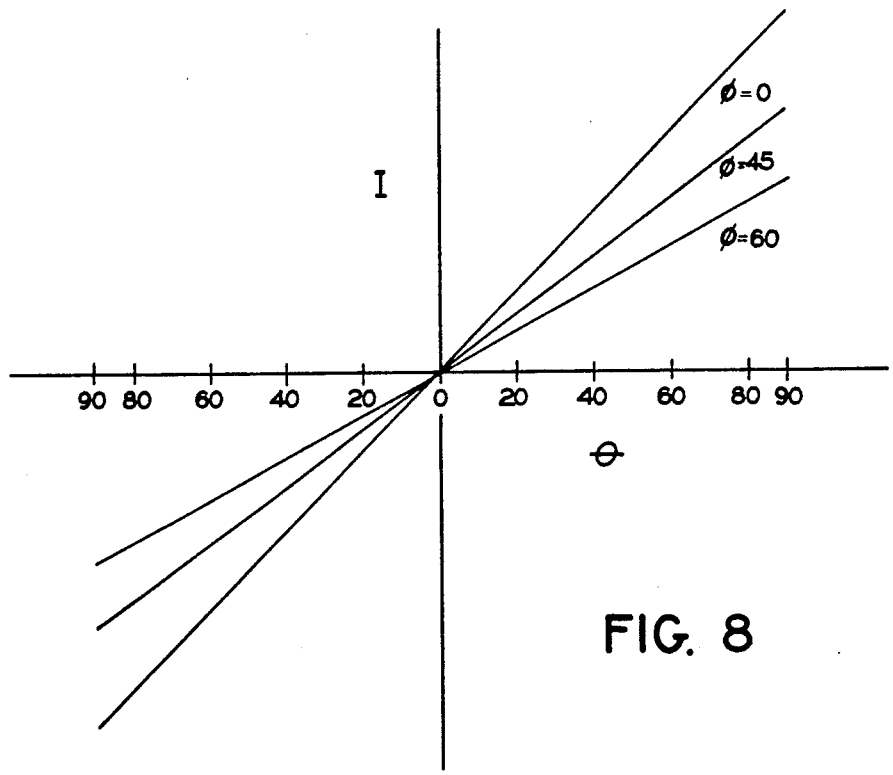
FIGURE 8 is a graph of control signal outputs I plotted against zenith angular displacements $\theta$ for various azimuth angles $\phi$.

The current output I from segments A1, A2 for controlling movement of the vehicle about the X axis is shown in FIGURE 8 and the output is linear for zenith angles $\theta$ from 0 to 90 degrees, and the current output I varies with the azimuth angle $\phi$. The curves show current output I plotted against zenith angle $\theta$ for azimuth angles $\phi$ of 0°, 45° and 60°. Zenith angle $\theta$ is the angle between the Z axis and the incident light rays and azimuth angle $\phi$ is the angle of rotation about the Z axis using the X axis as 0 degrees. The output from cells B1 and B2 for controlling movement of the vehicle about the Y axis is the same as the output from cells A1, A2 when the azimuth positions are displaced 90 degrees from the positions indicated.

Cells A1, A2, and B1, B2 locate the sun or other light source within a total solid angle of $2\pi$ steradians and sense the light source within this angle. To sense the sun through a complete sphere of $4\pi$ steradians, an arrangement of cells similar to those shown in FIGURES 3 to 6 may be used, but the cells should be oriented 180 degrees about the Y axis from the cells shown in FIGURES 3 to 6.

The light sensing device described herein is reliable, light in weight, compact and locates the light source over a large solid angle. The light sensing device converts the light signals into control signals linearly proportional to the attitude of the light sensing device relative to the light source for zenith angular displacements $\theta$ between 0 and 90 degrees for all azimuth angular displacements $\phi$ between 0 and 360 degrees. A suitable enclosure may be provided for the cells and the enclosure may be evacuated if desired.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A light sensing device comprising a photo-voltaic cell semicylindrical in shape and coated with light sensitive material at one side of a line corresponding to the function $h=kb$, where $h$ is the height of the semicylinder and $b$ is one-half the circumference of the cylinder and $k$ is a constant of proportionality.

2. A light sensing device comprising a photo-voltaic cell semicylindrical in shape and having its outer surface coated with light sensitive material at one side of a line corresponding to the function $h=kb$, where $h$ is the height of the semicylinder and $b$ is one-half the circumference of the cylinder and $k$ is a constant of proportionality.

3. A light sensing device comprising a photo-voltaic cell semicylindrical in shape and having its outer surface coated with light sensitive material at one side of a line and rendered opaque to light at the other side of the line, said line corresponding to the function $h=kb$, where $h$ is the height of the semicylinder and $b$ is one-half the circumference of the cylinder and $k$ is a constant of proportionality.

4. A light sensing device comprising a plurality of photo-voltaic cells providing electrical signals when exposed to light, each of said cells being semicylindrical in shape and being coated with a light sensitive material at one side of a line corresponding to the function $h=kb$, where $h$ is the height of the semicylinder and $b$ is one-half the circumference of the cylinder and $k$ is a constant of proportionality, said cells being physically arranged and electrically connected in pairs to provide electrical signals corresponding to the attitude of the light sensing device relative to the light source about one axis.

5. A light sensing device comprising a plurality of photo-voltaic cells providing electrical signals when exposed to light, each of said cells being semicylindrical in shape and being coated with a light sensitive material at one side of a line corresponding to the function $h=kb$, where $h$ is the height of the semicylinder and $b$ is one-half the circumference of the cylinder and $k$ is a constant of proportionality, said cells being physically arranged and electrically connected in pairs and the pairs being positioned at right angles to one another to provide electrical signals corresponding to the attitude of the light sensing device relative to the light source about mutually perpendicular axes.

6. Means for controlling the attitude of a space vehicle from the sun, comprising a light sensing device including light sensitive means providing electrical signals when exposed to light, said light sensitive means including a plurality of photo-voltaic cells semicylindrical in shape and coated with light sensitive material at one side of a line corresponding to the function $h=kb$, where $h$ is the height of the semicylinder and $b$ is one-half the circumference of the cylinder and $k$ is a constant of proportionality, said cells being physically arranged and electrically connected in pairs to provide electrical signals corresponding to the attitude of the vehicle relative to the sun about one axis.

7. Means for controlling the attitude of a space vehicle from the sun, comprising a light sensing device including light sensitive means providing electrical signals when exposed to light, said light sensitive means including a plurality of photo-voltaic cells semicylindrical in shape and coated with light sensitive material at one side of a line corresponding to the function $h=kb$, where $h$ is the height of the semicylinder and $b$ is one-half the circumference of the cylinder and $k$ is a constant of proportionality, said cells being physically arranged and electrically connected in pairs and the pairs being positioned at right angles to one another to provide electrical signals corresponding to the attitude of the vehicle relative to the sun about mutually perpendicular axes.

8. Means for controlling the attitude of a space vehicle from the sun, comprising a light sensitive device including light sensitive means providing electrical signals when exposed to light, said light sensitive means including a plurality of photo-voltaic cells semicylindrical in shape and having their outer surfaces coated with light sensitive material at one side of a line and rendered opaque to light at the other side of the line, said line corresponding to the function $h=kb$, where $h$ is the height of the semicylinder and $b$ is one-half the circumference of the cylinder and $k$ is a constant of proportionality, said cells being physically arranged and electrically connected in pairs to provide electrical signals corresponding to the attitude of the light sensing device relative to the sun about one axis.

9. Means for controlling the attitude of a space vehicle from the sun, comprising a light sensitive device including light sensitive means providing electrical signals when exposed to light, said light sensitive means including a plurality of photo-voltaic cells semicylindrical in shape and having their outer surfaces coated with light sensitive material at one side of a line and rendered opaque to light at the other side of the line, said line corresponding to the function $h=kb$, where $h$ is the height of the semi-cylinder and $b$ is one-half the circumference of the cylinder and $k$ is a constant of proportionality, said cells being physically arranged and electrically connected in pairs to provide electrical signals corresponding to the attitude of the light sensing device relative to the sum about one axis.

References Cited by the Examiner
UNITED STATES PATENTS

| | | | |
|---|---|---|---|
| 2,678,401 | 5/1954 | Jaeger | 250—211 X |
| 2,942,131 | 6/1960 | Diemer et al. | 250—213 X |
| 3,002,097 | 9/1961 | Nuut | 250—203 |
| 3,028,500 | 4/1962 | Wallmar | 250—211 |
| 3,033,073 | 5/1962 | Shuttleworth | 88—23 |
| 3,041,214 | 6/1962 | Goetzberger | 148—1 |
| 3,052,572 | 9/1962 | Hase | 117—200 |
| 3,062,691 | 11/1962 | Goorissen et al. | 148—1.5 |
| 3,065,112 | 11/1962 | Gilles et al. | 117—200 |
| 3,087,069 | 4/1963 | Moncrieff-Yeates | 250—211 |
| 3,098,934 | 7/1963 | Wilson et al. | 250—203 |
| 3,117,295 | 1/1964 | Luft | 338—19 |

RALPH G. NILSON, *Primary Examiner.*

WALTER STOLWEIN, *Examiner.*